(12) United States Patent
Hirt

(10) Patent No.: US 7,883,360 B2
(45) Date of Patent: Feb. 8, 2011

(54) BATTERY PACK

(75) Inventor: Daniel Hirt, Kirchentellinsfurt (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/634,854

(22) Filed: Dec. 10, 2009

(65) Prior Publication Data

US 2010/0087088 A1    Apr. 8, 2010

Related U.S. Application Data

(63) Continuation of application No. 11/696,266, filed on Apr. 4, 2007, now Pat. No. 7,670,171.

(30) Foreign Application Priority Data

Apr. 7, 2006   (DE) .................. 10 2006 018 009

(51) Int. Cl.
*H01R 3/00*    (2006.01)
(52) U.S. Cl. ......................... 439/500; 429/97
(58) Field of Classification Search ............. 439/500; 429/97, 100

See application file for complete search history.

(56) References Cited

U.S. PATENT DOCUMENTS

| 7,121,854 B2 | 10/2006 | Buck et al. ............... 439/160 |
| 2003/0039880 A1 | 2/2003 | Turner et al. |
| 2004/0029426 A1* | 2/2004 | Lui et al. ................. 439/218 |
| 2006/0222931 A1 | 10/2006 | Lin ............................ 429/100 |

FOREIGN PATENT DOCUMENTS

EP    1 025 961    8/2000

* cited by examiner

*Primary Examiner*—Edwin A. Leon
*Assistant Examiner*—Vanessa Girardi
(74) *Attorney, Agent, or Firm*—Michael J. Striker

(57) ABSTRACT

A battery pack for an electric appliance has a base body, a locking device for locking the base body to the electric appliance, at least one contact element for producing an electrical contact with the electric appliance, and a contact holding unit for holding the contact element. The locking device and the contact holding unit are fastened to the base body by a shared fastening module.

13 Claims, 3 Drawing Sheets

BATTERY PACK

CROSS-REFERENCE TO A RELATED APPLICATION

This application is a continuation of U.S. patent application Ser. No. 11/696,266 filed on Apr. 4, 2007 now U.S. Pat. No. 7,670,171, which is incorporated here by reference and which provides the basis for a claim of priority of invention.

The invention described and claimed hereinbelow is also described in German Patent Application DE 102006018009.7 filed on Apr. 7, 2006. This German Patent Application, whose subject matter is incorporated here by reference, provides the basis for a claim of priority of invention under 35 U.S.C. 119(a)-(d).

BACKGROUND OF THE INVENTION

The invention is based on a battery pack for an electric appliance.

A battery pack for a handheld power tool is known. In order to lock the battery pack to the handheld power tool, it is provided with a locking device. The battery pack also includes contact blades that produce an electrical contact between storage cells of the battery pack and the handheld power tool in the locked position. These contact blades are held by a contact holder in which counterpart connection means of the handheld power tool engage in the locked position.

SUMMARY OF THE INVENTION

The invention is based on a battery pack for an electric appliance having a base body, a locking device for locking the base body to the electric appliance, at least one contact element for producing an electrical contact with the electric appliance, and a contact holding means for holding the contact element.

According to one proposal, the locking device and the contact holding means are fastened to the base body by means of a shared fastening module. This makes it possible to advantageously reduce the assembly cost when assembling the battery pack, in particular by reducing the number of assembly steps. It is also possible to reduce the number of components, in particular for fastening the locking device and the contact means to the base body. The term "fastening module" should be understood in this context to particularly mean a module that is embodied as distinct from the base body and that represents a fastening interface between the locking device, the contact holding means, and the base body.

The fastening module is suitably embodied of one piece. Preferably, it has a fastening means for fastening to the base body. For example, the base body is embodied as the housing of the battery pack. In addition, the fastening module preferably has fastening means provided for fastening the locking device and the contact holding means.

The locking device and the contact holding means are advantageously fastened directly to the fastening module. The locking device, the contact means, and the fastening module suitably constitute a structural unit that can be preassembled outside of the base body. The locking unit and the contact holding means can be fastened to the fastening module before the fastening module is fastened along with the locking device and the contact holding means to the base body. The fastening module can be embodied in the form of an intermediate piece, e.g. an intermediate flange.

According to another proposal, the contact holding means is embodied as integrally joined to the fastening module. This makes it possible to eliminate additional fastening components and thus to reduce the amount of space required and the number of assembly steps. It is also possible to achieve a particularly effective support of a contact element. Alternatively or in addition, the locking device can be embodied as integrally joined to the fastening module. Moreover, the contact holding means can be embodied as detachable from the fastening module; the contact holding means can be fastened to the fastening module by means of a nonpositive, frictional engagement, a material adhesion, and/or particularly advantageously by means of a form-locked engagement, which makes it possible to achieve a simple fastening.

If the fastening module is provided for a toolless fastening of the locking device, then the assembly can be further simplified and easily automated.

A particularly simple and secure fastening of the locking device can be achieved if the locking device is fastened to the fastening module by means of a form-locked engagement. For example, the locking device can be fastened to the fastening module through the production of a detent connection, e.g. a snap connection. It is also conceivable to fasten the locking device by means of a nonpositive, frictional engagement and/or a material adhesion.

According to another proposal, the locking device is situated on the fastening module in a movable fashion. This enables a sturdy support of the locking device in its movements, e.g. when a user actuates it.

In this connection, a structurally simple locking mechanism can be achieved if the locking device used is situated on the fastening module in pivoting fashion.

In an advantageous modification of the invention, the fastening module encompasses at least a subregion of the locking device. This makes it possible to achieve a compact design of the battery pack and a sturdy and secure support of the locking device on the fastening module. If the locking device is situated on the fastening module in a movable, in particular pivoting, fashion, then the subregion of the locking device can constitute a sliding surface that slides against the fastening module when the locking device is moved. In particular, the subregion can be embodied in the form of a pivot axle of the locking device in which a section of the fastening module encompasses the pivot axle. This section can advantageously also serve as a fastening element for the fastening of the locking device.

The locking device advantageously has a locking means that is fastened to the fastening module. This makes it possible to achieve a sturdy and secure support of the locking means by means of the fastening module.

According to another proposal, the locking means is embodied in the form of a spring element. This makes it possible for the locking means to be held in a desired position due to an inherent force of the locking means and thus makes it possible to achieve a structurally simple embodiment of the locking device. The locking element is preferably embodied in the form of a metal spring, which permits the use of conventional, sturdy, and inexpensive locking means. For example, the spring element is embodied in the form of a flexion spring, in particular a leaf spring.

In this connection, the spring element according to the invention includes a detent shape. This makes it possible to achieve a particularly sturdy and secure locking mechanism.

In another embodiment of the invention, the locking device has a locking means and an actuating means for actuating the locking means; the locking means connects the fastening means to the fastening module. This makes it possible to achieve a particularly compact and simple embodiment of the locking device. Preferably, the actuating means is fastened to the actuating module. In addition, the actuating means is situated on the fastening module in a movable, e.g. pivoting, fashion.

Furthermore, it is possible to achieve a particularly compact embodiment of the battery pack if the battery pack has at least one storage cell; the locking device, the contact holding means, and the fastening module constitute a structural unit that at least partially encompasses the storage cell.

The invention also proposes an electric appliance, in particular a handheld power tool, having an electric appliance base body, e.g. a grip. This electric appliance advantageously has a battery pack that can be detached from the electric appliance base body and that has a base body, a locking device for locking the base body to the electric appliance base body, at least one contact element for producing an electrical contact with the electric appliance base body, and a contact holding means for holding the contact element; the locking device and the contact holding means are fastened to the base body by means of a shared fastening module. This makes it easily possible to achieve a low assembly cost. The electric appliance can also be embodied in the form of a charging unit for charging the battery pack.

Other advantages ensue from the following description of the drawings. An exemplary embodiment of the invention is shown in the drawings. The drawings, the description, and the claims contain numerous features in combination. Those skilled in the art will also suitably consider the features individually and unite them in other meaningful combinations.

DESCRIPTION OF THE PREFERRED EMBODIMENTS

Figure 1:
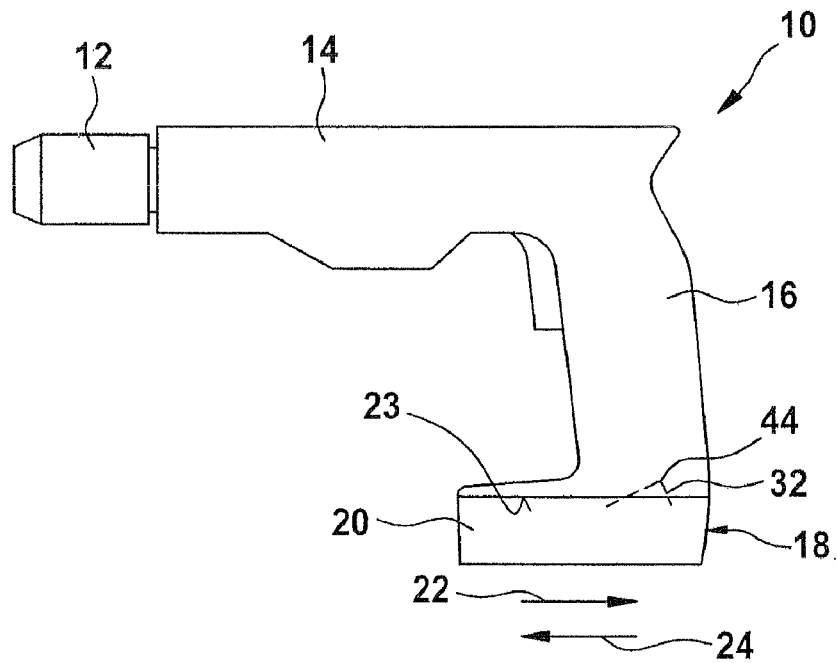
FIG. 1 shows a cordless power screwdriver and a battery pack locked to the handheld power tool, in accordance with the present invention.

FIG. 1 shows an electric appliance 10 embodied in the form of a handheld power tool. The handheld power tool is embodied in the form of a cordless power screwdriver. It has an electric appliance base body 14 to which a tool holder fitting 12 is fastened. The electric appliance base body 14 also comprises a grip 16 to which a battery pack 18 is locked. The battery pack 18 includes a base body 20, which is embodied as the housing of the battery pack 18. The battery pack 18 is embodied in the form of a sliding battery pack. In order to lock the battery pack 18 to the grip 16, the base body 20 is slid in a sliding direction 24 along the grip 16, in fact along a lower outer surface 23 of the grip 16 extending essentially perpendicular to the longitudinal direction of the grip 16.

Once this position is reached, the battery pack 18 is locked to the grip 16 by means of a locking means 32 of a locking device 30 (FIGS. 2 through 5). The locking means 32 has a detent shape 44. In its locked position shown in the drawing, this detent shape is engaged in a detent recess, not shown in detail, of the grip 16. The battery pack 18 can be unlocked from the electric appliance 10 by actuating an actuating means 34 (FIG. 2) of the locking device 30, which withdraws the detent shape 44 from the grip 16. After the battery pack 18 has been unlocked, the base body 20 can be separated from the electric appliance 10, in fact by sliding the base body 20 in a removal direction 22 along the lower, outer surface 23 of the grip 16. The sliding direction 24 and the removal direction 22 are oriented essentially perpendicular to the longitudinal direction of the grip 16.

Figure 2:
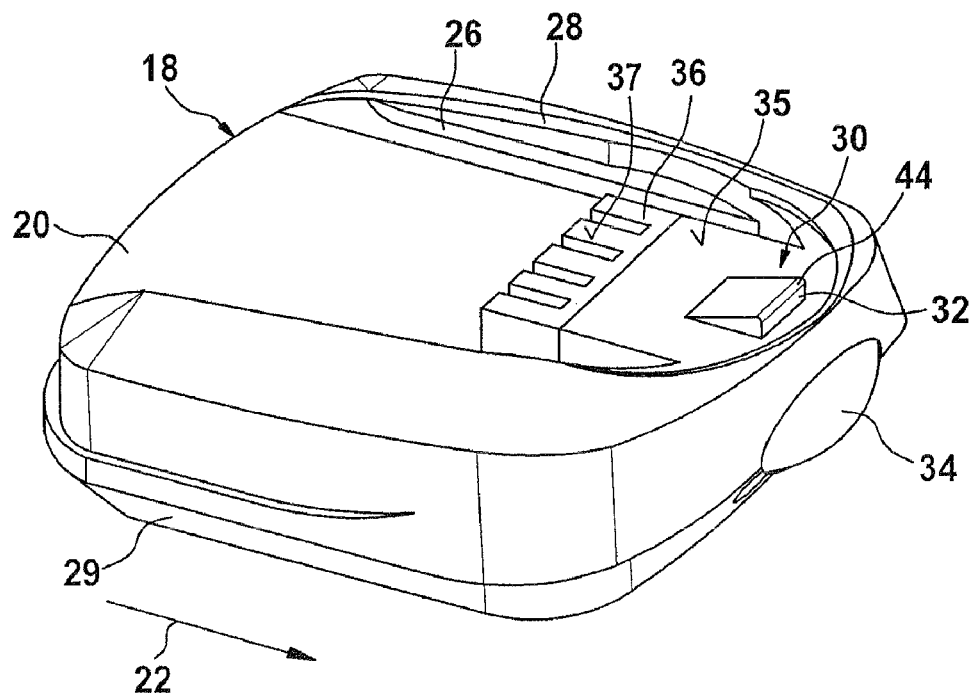
FIG. 2 is a perspective view of the battery pack from FIG. 1 in accordance with the present invention.
Figure 3:
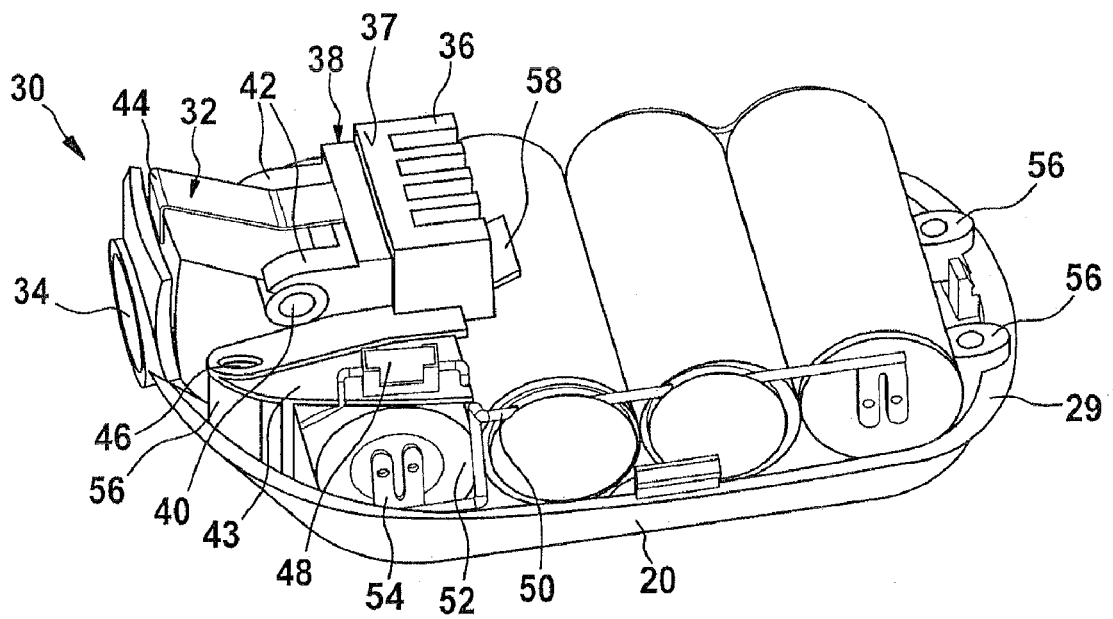
FIG. 3 shows the battery pack with a housing shell removed, revealing the internal components in accordance with the present invention.

FIG. 2 is a perspective view of the battery pack 18. The drawing shows the locking means 32 and the base body 20 embodied as a housing. The detent shape 44 of the locking means 32 protrudes up from a surface 35 of the base body 20, which surface is embodied in the form of a contact surface and which, when the battery pack 18 is in the locked position, rests against the grip 16, in particular against the outer surface 23 of the grip 16. Adjoining the surface 35, the drawing shows a surface 37 of a contact holding means 36. This contact holding means 36 serves to hold conducting contact elements 66 (FIG. 5) in order to produce an electrical contact between the electric appliance 10 and storage cells 52 situated in the base body 20 (FIG. 3). When the base body 20 is slid along the grip 16, counterpart connection means of the electric appliance 10 engage in slots of the contact holding means 36 in which they come into contact with the contact elements 66 of the battery pack 18. The base body 20 is also provided with a guiding means, which is embodied in the form of two guide rails 26. One guide rail 26 is visible in the figure. This guide rail 26 is integrally formed onto a wall of an upper housing shell 28 of the base body 20. The upper housing shell 28 is attached to a lower housing shell 29 (see FIG. 3). When the base body 20 is slid along the grip 16, the guide rails 26 each engage in a recess of the grip 16 (not shown), producing a groove/spring connection with the grip 16.

During the sliding process, the base body 20 is supported by the grip 16, thus making it possible to prevent the battery pack 18 from being dropped as it is guided along the grip 16. In order to unlock the battery pack 18 from the grip 16, the battery pack 18 is also provided with the actuating means 34, which is embodied in the form of a pushbutton. The unlocking mechanism will be described in detail in conjunction with the subsequent figures.

FIG. 3 shows the battery pack 18; the upper housing shell 28 of the base body 20 has been removed from the lower housing shell 29. The drawing shows the upper surface 37 of the contact holding means 36 (see FIG. 2); the locking device 30 with the actuating means 34 and the locking means 32, which has the detent shape 44; and storage cells 52.

In order to fasten the locking device 30 and the contact holding means 36 to the base body 20, namely to the lower housing shell 29, the battery pack 18 is provided with a fastening module 38. This fastening module 38 constitutes a fastening interface between the locking device 30 and the contact holding means 36 on the one hand and the base body 20 or lower housing shell 29 on the other. This fastening module 38, together with the locking device 30, the contact holding means 36, and a contact holding means 60 shown in FIG. 4, constitutes a structural unit 68 (FIG. 4), in particular a cohesive structural unit 68 that is fastened to the base body 20. To this end, the fastening module 38 has fastening means 42 for fastening the locking device 30 to the fastening module 38 on the one hand and fastening means 46 for fastening the fastening module 38 to the base body 20 on the other.

In this exemplary embodiment, the contact holding means 36 is integrally formed onto the fastening module 38. The fastening module 38 has a first subregion that is offset relative to the surface 37 of the contact holding means 36. This subregion has a slot into which the locking means 32 is slid and clamped firmly in place. The subregion also has two snap arms, which constitute the fastening means 42 for fastening the locking device 30. A subregion 40 of the actuating means 34 engages in detent fashion or is snapped into these fastening means 42. The actuating means 34 of the locking device 30 is situated on the fastening module 38 in a pivoting fashion. To this end, the subregion 40 is embodied as a pivot axle. The subregion 40 also constitutes a sliding surface that slides against the fastening means 42 during a pivoting of the actuating means 34.

The fastening module 38 also has an additional subregion, which is embodied in the form of a plateau 43 supported on one of the storage cells 52. The plateau 43 has a recess that constitutes the fastening means 46 for the fastening of the fastening module 38 to the base body 20. A protrusion of a screw socket 56 of the lower housing shell 29, which socket is not visible in the figure, is clamped in this recess. By means of this nonpositive, frictional engagement, the fastening module 38 is secured to the base body 20. The screw socket 56 of the housing shell 29 and the recess of the fastening means 46 also permit a fastening screw to pass through during an assembly of the battery pack 18 in order to fasten the upper housing shell 28 to the lower housing shell 29.

The lower housing shell 29 also has additional screw sockets 56 on a side of the housing shell 29 opposite from the locking device 30. In addition, a cylindrical electrical component 48 is fastened to the plateau 43. This component serves to prevent short-circuiting of the battery pack 18 and to this end, is connected to the storage cells 52 via an electrical connection 50 and conducting contacts 54 of the storage cells 52. The electrical component 48 is situated so that it engages in detent fashion between snap arms of the plateau 43 (also see FIG. 5). The fastening module 38 can have additional electrical components fastened to it such as an electrical encoding for identification of the battery pack 18.

In an alternative embodiment, it is conceivable for the contact holding means 36 to be embodied as detachable from the fastening module 38. In this case, the fastening module 38 has fastening means for fastening the contact holding means 36. In another variant, it is conceivable for the locking device 30 to be embodied as integrally joined to the fastening module 38.

Figure 4:
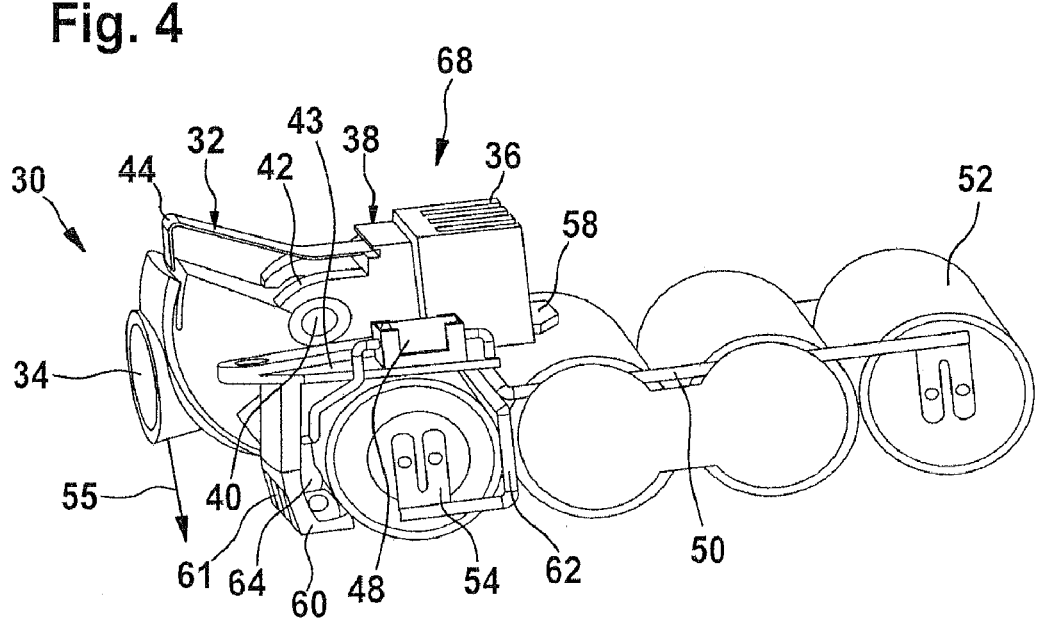
FIG. 4 shows a locking device, a contact holding means, and storage cells of the battery pack in accordance with the present invention.

FIG. 4 shows a view of the battery pack 18 in which the lower housing shell 29 has been removed. The drawing also shows an additional contact holding means 60 in addition to the components described above in conjunction with FIG. 3. In the mounted position of the battery pack 18, this contact holding means 60 is situated in an opening, not shown, of the lower housing shell 29. The contact holding means 60 is integrally formed onto the fastening module 38. The contact holding means 60 holds contact elements 61, which are embodied in the form of bell-shaped contacts. When the storage cells 52 are being charged, these contact elements 61 produce an electrical contact with counterpart connection means of a charging unit that is not shown.

The contact elements 61 are visible to the user through the above-mentioned opening of the lower housing shell 29. The contact holding means 60 is electrically connected to the storage cells 52 via an electrical connection 64 and the electrical component 48. In another exemplary embodiment, it is conceivable for the contact holding means 60 to be embodied as detachable from the fastening module 38 and to be fastened to the fastening module 38. It is also conceivable for the battery pack 18 to be embodied without contact holding means 60. The figure also shows an electrical connection 62 through which the storage cells 52 are electrically connected to the contact holding means 36.

The locking means 32 is embodied in the form of a metallic leaf spring serving as spring element. As described above, this spring element is fastened to the fastening module 38 on the one hand and to the actuating means 34 on the other. The locking means 32 is fastened to the actuating means 34 so that when the actuating means 34 is pivoted, the locking means 32 is carried along with it and when pressure is exerted on the detent shape 44, the locking means 32 engages further in the actuating means 34. Starting from the locked position of the battery pack 18 shown in FIG. 1, in which the detent shape 44 of the locking means 32 is engaged in the electric appliance 10 in detent fashion, in order to unlock the battery pack 18, the user actuates the actuating means 34.

In this case, the user exerts an actuating force on the actuating means 34 in the direction toward the bottom of the lower housing shell 29, in fact in the actuating direction 55. In so doing, the actuating means 34 is pivoted around its subregion 40 embodied in the form of a pivot axle. The locking means 32 is carried along with this pivoting motion, thus moving the detent shape 44 downward in the actuating direction 55. The detent shape 44 is withdrawn from the electric appliance 10, thus unlocking the battery pack 18 from the electric appliance 10.

When the battery pack 18 is unlocked from the electric appliance 10, as the base body 20 is slid along the handle 16, the surface 23 of the grip 16 pushes the locking means 32 into the outer surface 35 of the housing shell 28 until the detent shape 44 engages in the electric appliance 10. When pressure is exerted on the detent shape 44, the locking means 32 engages further in the actuating means 34, as described above.

Figure 5:
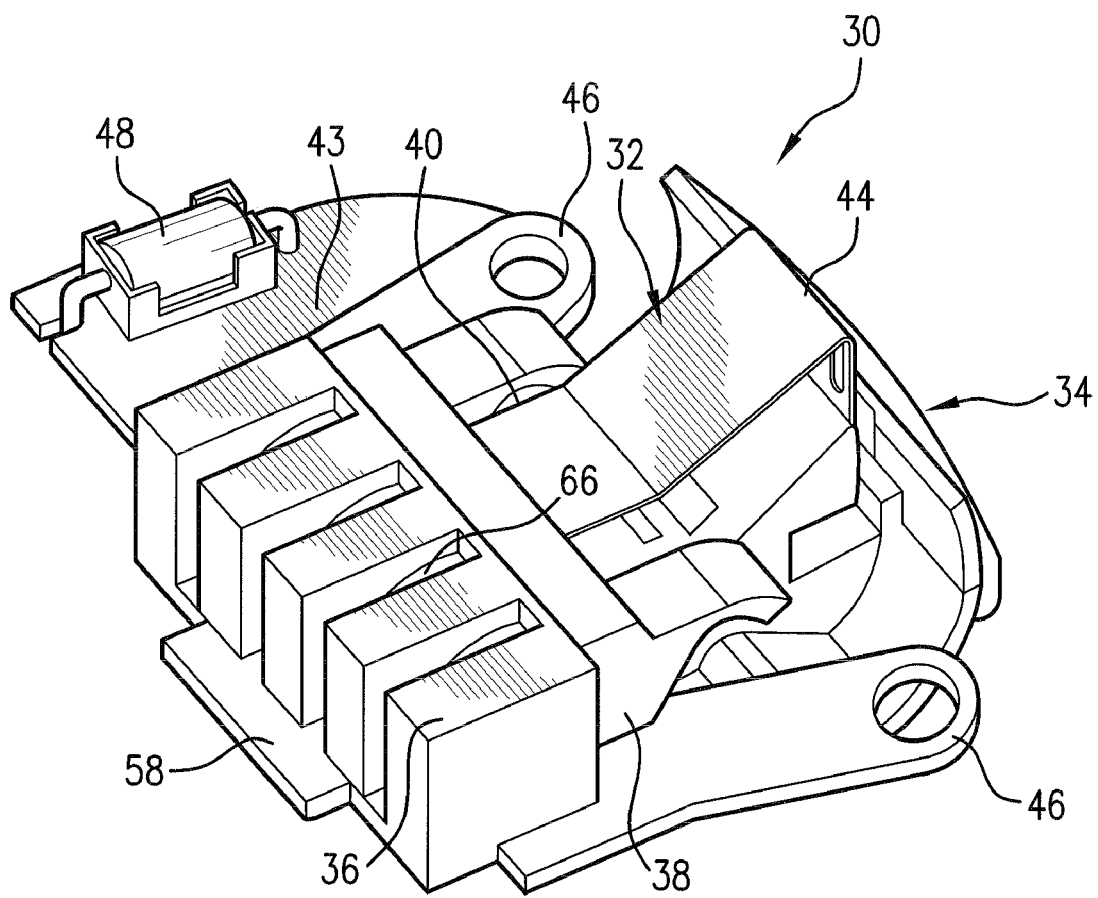
FIG. 5 shows the contact holding means and the locking device from FIG. 4 in accordance with the present invention.

FIG. 5 shows the fastening module 38 to which the locking device 30 is fastened and onto which the contact holding means 36 is integrally formed. The drawing shows the plateau 43 to which the electrical component 48 is fastened and onto which the fastening means 46 is formed. An additional fastening means 46 is situated on a side of the fastening module 38 oriented away from the plateau 43. The drawing also shows the electrical contact elements 66 contained in the slots of the contact holding means 36. The contact elements 66 are extrusion-coated with plastic during the manufacture of the fastening module 38. The contact holding means 36 has an additional fastening means 58 formed onto it, embodied in the form of a hook provided for fastening to the upper housing shell 28.

In the preparations for assembling the battery pack 18, the structural unit 68, which is comprised of the locking device 30 and the fastening module 38 with the contact holding means 36 and 60 integrally formed onto it, is preassembled separately from the base body 20. To this end, the fastening means 34 is attached to the fastening module 38 in a toolless fashion, in fact by means of the subregion 40 embodied in the form of a pivot axle engaging in detent fashion or being snapped into the fastening means 42 embodied in the form of snap arms. Then the locking means 32 embodied in the form of a spring element is slid into the fastening module 38 on the one hand and into the fastening means 34 on the other.

During assembly of the battery pack 18, this cohesive structural unit 68 is placed onto the storage cells 52. A soldering procedure produces electrical connections between the contact holding means 36, 60 and the storage cells 52. When placed onto the storage cells 52, the structural unit 68 encompasses at least one of the storage cells 52 (see FIG. 4). The set of storage cells 52, together with the structural unit 68, is then inserted into the lower housing shell 29. In so doing, shapes of two of the screw sockets 56 of the lower housing shell 29 are clamped into the fastening means 46 of the fastening module 38. Then the upper housing shell 28 is placed onto the lower housing shell 29 and the housing shells 28, 29 are screwed to each other, with the screws passing through the screw sockets 56 of the housing shell 29.

It will be understood that each of the elements described above, or two or more together, may also find a useful application in other types of constructions differing from the type described above.

While the invention has been illustrated and described as embodied in a battery pack, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

The invention claimed is:

1. A battery pack for an electrical appliance, comprising
   a base body;
   a locking device for locking said base body to the electrical appliance;
   at least one contact element for producing an electrical contact with the electrical appliance;
   contact holding means for holding said contact element; and
   a shared fastening module by which said locking device and said contact holding means are fastened to said base body, wherein said base body has an upper housing shell including guiding means and a lower housing shell, wherein said contact holding means is configured as integrally joined to said fastening module; and
   an additional contact holding means, which is separate and distinct from said contact holding means, wherein the additional contact holding means is integrally formed onto the fastening module.

2. A battery pack as defined in claim 1, wherein said fastening module is provided for a toolless fastening of said locking device.

3. A battery pack as defined in claim 1, wherein said locking device is attached to said fastening module by a form-locked engagement.

4. A battery pack as defined in claim 1, wherein said fastening module includes at least a subregion of said locking device.

5. A battery pack as defined in claim 1, wherein said locking device has locking means and actuating means for actuating said locking means, said locking means connecting said actuating means to said fastening module.

6. A battery pack as defined in claim 1; and further comprising at least one storage cell, said locking device, said contact holding means and said fastening module forming a structural unit that at least partially encompasses said storage cell.

7. A battery pack as defined in claim 1, wherein the contact holding means comprises a plurality of slots for engaging counterpart connection means of the electrical appliance.

8. A battery pack as defined in claim 1, wherein said locking device is situated on said fastening module in a moveable fashion.

9. A battery pack as defined in claim 8, wherein said locking device is situated on said fastening module in a pivoting fashion.

10. A battery pack as defined in claim 1, wherein said locking device has locking means that is fastened to said fastening module.

11. A battery pack as defined in claim 10, wherein said locking means is configured as a spring element.

12. A battery pack as defined in claim 11, wherein said spring element includes a detent shape.

13. An electrical appliance, comprising
    an electrical appliance base body; and
    a battery pack detachable from said electrical appliance base body, said battery pack including
    a base body,
    a locking device for locking said base body to the electrical appliance,
    at least one contact element for producing an electrical contact with the electrical appliance,
    contact holding means for holding said contact element, and
    a shared fastening module by which said locking device and
    said contact holding means are fastened to said base body,
    wherein said base body has an upper housing shell including
    guiding means and a lower housing shell and
    wherein said contact holding means is configured as integrally joined to said fastening module
    wherein an additional contact holding means, which is separate and distinct from said contact holding means, is arranged on a lower side of the fastening module, which in an assembled state, faces the lower housing shell.

\* \* \* \* \*